Figure 1:
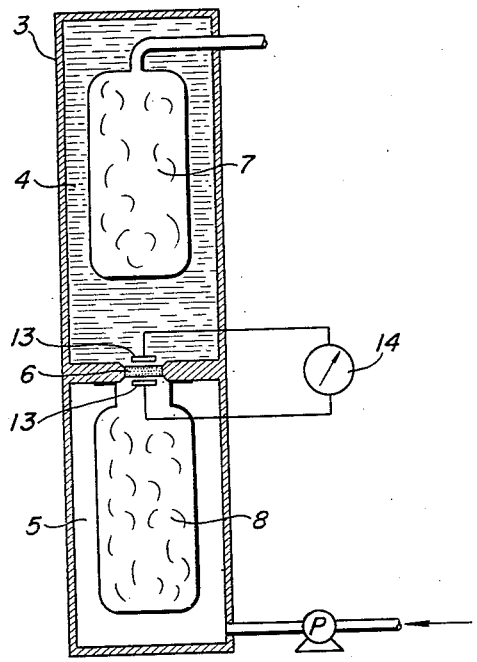

May 28, 1957  M. C. TERRY  2,794,171
APPARATUS FOR MEASURING THE RATE OF AN ELECTRICALLY
CONDUCTING LIQUID
Filed Nov. 23, 1953

INVENTOR.
Melvin C. Terry,
BY Melvin F. Fincke
ATTORNEY 2,794,171

APPARATUS FOR MEASURING THE RATE OF AN ELECTRICALLY CONDUCTING LIQUID

Melvin C. Terry, Houston, Tex., assignor, by mesne assignments, to Esso Research and Engineering Company, Elizabeth, N. J., a corporation of Delaware Application November 23, 1953, Serial No. 393,643

7 Claims. (Cl. 324—71)

This invention relates to a method and apparatus for measuring the rate of flow of an electrically conducting liquid.

It is well known that a measurable potential is set up across certain porous materials, such as fritted glass, which is proportional to the rate of flow of a fluid which is flowing through said porous material. This phenomenon is known as the electrokinetic or streaming potential effect. However, in the past it has been found that if one attempts to measure an electrically conducting fluid, such as an electrolyte by means of the electrokinetic potential effect, the electrically conducting fluid shorts out the potential established across the porous material. Therefore, it is impossible to measure directly the rate of flow of an electrically conducting liquid such as an electrolyte by this method.

Other means may be used other than the streaming potential measurement method to measure the rate of flow of an electrolyte. However, in certain operations, such as in geophysical exploration operations, wherein an instrument for injecting fluids that are electrolytes into substrata is lowered into a borehole, it is highly desirable to obtain an indication at the surface of the rate of flow of the fluid into the substrata. A surface indication is very easily and conveniently obtained through the utilization of electrical means. Hence, an instrument which would remotely indicate the rate of flow of an electrolyte by means of the electrokinetic effect and at the same time not be subject to the possibility of "shorting out" is very useful.

It is an object therefore of this invention to devise a method and apparatus for indirectly measuring the rate of flow of an electrically conducting liquid by means of the electrokinetic effect.

It is a further object of this invention to provide an instrument for measuring the rate of flow of an electrically conducting liquid which can be used in operations where it is necessary that the rate of flow of said electrically conductive liquid must be read at some distance from the location of the instrument.

It is still a further object of this invention to provide an instrument for measuring the rate of flow of an electrically conductive liquid by means of the electrokinetic effect whose potential cannot be shorted out.

The foregoing objects are carried out by the provision of a housing divided into two separate chambers with a flexible bag contained within one of said chambers, said flexible bag containing the electrolyte which rate of flow it is desired to measure. Contained within the other chamber is a bag of distilled water so positioned that any fluid flowing from said bag must also flow through a porous member into the chamber containing the bag filled with the electrically conducting liquid. The distilled water displaces distilled water contained within the chamber containing the electrolyte. Hence, it can be seen that the potential developed across electrodes spaced near the porous member is proportional to the rate of flow of a nonconducting liquid which rate of flow is the same as the rate of flow of the electrically conducting liquid.

Figure 2:
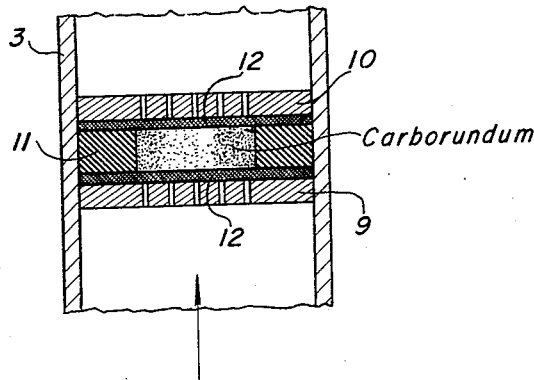

Referring now to the drawing,

Fig. 1 is a diagrammatic view of the type of instrument utilized in my invention; and Fig. 2 is a sectional view of a second embodiment of a porous member which is especially useful in high pressure areas.

Referring more specifically to the drawings, Fig. 1 shows a housing member 3 which is divided into two chambers 4 and 5 by means of a porous member 6. The upper chamber 4 is filled with distilled water. A first flexible bag 7 containing an electrically conducting liquid is disposed within said upper chamber 4. Positioned on the other side of the porous member 6 is a second flexible bag 8 containing distilled water or any other substantially nonconducting fluid. This second flexible bag 8 is positioned so that any fluid leaving the bag as a result of a differential pressure set up between the first and second chambers must pass through the porous member 6. A source of pressure, such as a pump, is connected to the lower chamber. To measure the potential across the porous member 6 caused by the flow of the substantially nonconducting fluid through porous member 6 an electrode is disposed on each side of porous member 6. These electrodes 13 are electrically connected to a meter 14 which indicates the potential established across the electrodes when a fluid is flowing through the porous member 6. This meter, for example, may be in the form of a vacuum tube voltmeter. An example of a porous member which can be utilized under normal pressures is a fritted glass disc. However, it has been discovered that under very high pressures such as the pressures found within a deep well, the fritted glass disc is easily broken.

Fig. 2 shows in sectional view the type of arrangement which has been found especially satisfactory when used in high pressure areas. In Fig. 2 numbers 9 and 10 are brass plate electrodes contained within the housing 3. These electrodes are perforated with a plurality of holes in order to permit the flow of fluid through said electrodes. A rubber washer 11 is disposed between said two electrodes 9 and 10. Confined within the center of said rubber washer 11 is a porous material which has electrokinetic properties such as carborundum. This confinement of the carborundum is accomplished by means of meshed screen members 12. This arrangement provides a certain amount of flexibility and when the instrument containing this embodiment of my invention is utilized in a high pressure area, the pressure will be absorbed by the rubber washer member 11 and hence no breakage of the instrument will occur.

Although the instrument has been described herein as having the flexible bag containing the electrically conducting liquid in the upper chamber and the flexible bag containing the distilled water in the lower chamber, it can be readily appreciated that reversing the relative positions of said members would not alter the invention. For example, the electrically conducting liquid could be located in a lower chamber with a valve connected to an outlet means whereby upon opening said valve thereby permitting a flow of said electrically conducting liquid, said electrically conducting liquid being replaced by an equal amount of distilled water, the rate of flow of the distilled water can be easily determined. Also, it can be readily conceived of using my method of determining the flow of an electrically conducting liquid without the use of bag member 7. The purpose of bag member 7 is to isolate the electrolyte from the distilled water thereby preventing any dilution of the electrolyte.

The pressure applied to the nonconducting liquid can be applied by means of any suitable pressure applying means or by hand.

In operation, therefore, it is seen that in utilizing my apparatus and method one simply applies a pressure differential between the separate chambers thereby causing a flow of the electrolyte. The electrolyte which flows out of one chamber is replaced by an equivalent amount of the distilled water from the other chamber. The rate of flow of the distilled water is indicated at a remote distance from said instrument by means of the electrokinetic effect. This indication gives the rate of flow of the electrically conducting liquid.

Obviously many modifications and variations of the present invention are possible in the light of the above teachings. It is, therefore, to be understood that within the scope of the appended claims the invention can be practised otherwise than as specifically described.

Having thus described my invention, what I claim as new and patentable and desire to secure by Letters Patent of the United States is:

1. In an instrument for measuring the rate of flow of an electrically conducting liquid, a housing, a porous member dividing said housing into two chambers, one of said chambers containing distilled water, a first flexible bag containing an electrically conducting liquid and having an outlet disposed within said chamber, a second flexible bag containing distilled water disposed within the other of said two chambers in a manner such that any distilled water flowing from said second flexible bag must flow through said porous member, and means for measuring the rate of flow of distilled water from said second flexible bag due to a differential pressure between said two chambers.

2. In an instrument for measuring the rate of flow of an electrically conducting liquid, a housing, a porous member dividing said housing into an upper chamber and a lower chamber, said upper chamber containing distilled water, a first flexible bag containing an electrically conducting liquid and having an outlet disposed within said upper chamber, a second flexible bag containing distilled water disposed within said lower chamber in a manner such that any liquid flowing from said second flexible bag must also flow through said porous member, a source of pressure connected to said lower chamber, a pair of electrodes, one on each side of said porous member, said electrodes being electrically connected to a remote vacuum tube voltmeter, whereby an indication of the rate of flow of liquid from said second flexible bag is indicated, the rate of flow of said liquid being the same as the rate of flow of the electrically conducting liquid from said first flexible bag.

3. In an instrument for measuring the rate of flow of an electrically conducting liquid: a housing; a porous member dividing said housing into first and second chambers, said first chamber enclosing a collapsible third chamber containing an electrically conducting fluid, said second chamber containing an electrically nonconducting liquid; said third liquid chamber having an outlet; and means associated with said porous member and responsive to the flow of fluid through said porous member for measuring the rate of flow of said nonconducting fluid when pressure is applied to said second chamber, the rate of flow of said nonconducting fluid being the same as the rate of flow from said outlet of said electrically conducting liquid.

4. An instrument according to claim 3 wherein said porous member consists of a fritted glass plate.

5. An instrument according to claim 3 wherein said porous member consists of a rubber washer, said rubber washer having screen mesh abutting its upper and lower sides, said screen mesh being adapted to retain a porous material within said washer, and wherein said means for measuring the rate of flow of said nonconducting fluid comprises a pair of perforated electrodes connected to a voltmeter, one of said electrodes being positioned on one side of said porous member and the other electrode being positioned on the other side of said porous member.

6. In an instrument for measuring the rate of flow of an electrically conducting liquid: a chamber enclosing a first flexible bag containing an electrically conducting liquid, said bag having an outlet; a second flexible bag having an opening containing a nonconducting liquid; a porous member separating said chamber from said opening of said second flexible bag; and means associated with said porous member and responsive to the flow of liquid through said porous member for measuring the rate of flow of said nonconducting liquid when pressure is applied to the exterior of said second flexible bag.

7. In an instrument for measuring the rate of flow of an electrically conducting liquid: a housing; a separating member including a porous section dividing said housing into first and second chambers; a first flexible bag disposed in said first chamber and containing said electrically conducting liquid; said second chamber containing a second flexible bag attached to said separating member so that the interior of said second flexible bag is in fluid communication with said first chamber through said porous member, and so that said second flexible bag will prevent fluid communication between said first and second chambers; said second flexible bag containing electrically nonconducting fluid; and means associated with said porous member and responsive to the flow of fluid through said porous member for measuring the rate of flow of said nonconducting fluid when pressure is applied to said second chamber, the rate of flow of said nonconducting fluid being the same as the rate of flow from said outlet of said electrically conducting liquid.

References Cited in the file of this patent

UNITED STATES PATENTS

| | | |
|---|---|---|
| 2,492,493 | Misson | Dec. 27, 1949 |
| 2,569,625 | Wyllie | Oct. 2, 1951 |
| 2,615,940 | Williams | Oct. 28, 1952 |